United States Patent [19]
Horst

[11] Patent Number: 5,633,546
[45] Date of Patent: May 27, 1997

[54] MAGNETIC SENSOR FOR SWITCHED RELUCTANCE MOTOR

[75] Inventor: Gary E. Horst, Manchester, Mo.

[73] Assignee: Emerson Electric Co., St. Louis, Mo.

[21] Appl. No.: 175,516

[22] Filed: Dec. 30, 1993

[51] Int. Cl.$^6$ .............................. H02K 11/00; G01B 7/30
[52] U.S. Cl. ................... 310/68 B; 324/207.25
[58] Field of Search ........................... 310/68 B, 68 R, 310/254, 156; 324/207.25; 318/254

[56] References Cited

U.S. PATENT DOCUMENTS

| | | | |
|---|---|---|---|
| 4,968,913 | 11/1990 | Sakamoto | 310/156 |
| 5,107,159 | 4/1992 | Kordik | 310/156 |
| 5,148,070 | 9/1992 | Frye et al. | 310/168 |
| 5,194,771 | 3/1993 | Otsuki et al. | 310/68 B |
| 5,291,104 | 3/1994 | Okada et al. | 318/254 |
| 5,325,005 | 6/1994 | Denk | 310/68 B |
| 5,418,416 | 5/1995 | Muller | 310/186 |
| 5,498,919 | 3/1996 | Bahn | 310/268 |

*Primary Examiner*—Thomas M. Dougherty
*Assistant Examiner*—Michael Wallace, Jr.
*Attorney, Agent, or Firm*—Polster, Lieder, Woodruff & Lucchesi

[57] ABSTRACT

Sensing apparatus for use on a polyphase switched reluctance motor (M, M'). The motor has a stator assembly (SA) and a rotor assembly (RA) including a rotor shaft (S) on which the rotor assembly is mounted for rotation with respect to the stator. Each respective motor phase is switched between active and inactive states by a commutator controller (C) responsive to sensed motor operating conditions. Switching a phase to its active state includes supplying current to the respective rotor phase windings, and switching the phase to its inactive state includes cessation of the current supply. Accordingly, there is a turn-on, running, and turn-off portion of each cycle of current supply with the turn-on portion of the cycle lasting approximately 30%–45% as long as the turn-off cycle. The apparatus includes a magnetic ring (10, 10') installed on the rotor shaft and rotatable therewith. It also includes a sensor (12, 14) for sensing changes in a magnetic field produced by the ring as it rotates with the shaft. The magnetic ring has a set of magnetic poles for each motor phase. The portion of the circumference of the ring subtended by one of the poles of each set is greater than that subtended by the other pole of the set. Respective portions of the circumference subtended by the poles in each set is proportional to the turn-off time to the turn-on time.

17 Claims, 2 Drawing Sheets

2 POLE ROTOR

2 POLE ROTOR

2 POLE ROTOR

4 POLE ROTOR.

MAGNETIC SENSOR FOR SWITCHED RELUCTANCE MOTOR

BACKGROUND OF THE INVENTION

This invention relates to switched reluctance motors and, more particularly, to an improved magnetic sensor for use with such motors.

Ring magnets are used in various industrial applications for sensing purposes. One of these applications is in dynamoelectric machines such as electric motors. In use on such motors, for example on switched reluctance motors (SRM's), the magnetic sensor comprises a ring installed on the rotor shaft of the motor so it turns as the rotor turns. When used with a Hall effect sensor, the magnetic sensor provides positional information which is used by control electronics for the motor to determine motor speed. This information is usable, in turn, to control switching between motor phases for commutation purposes. Conventionally, the magnet ring has opposed poles with the north and south poles subtending equal arcs about the circumference of the ring. This means that for each motor revolution, the Hall sensor sees each pole an equal amount of time. With respect to application of current to these polyphase motors, the effect is that the turn-on and turn-off portions of each cycle are approximately equal. In some polyphase SRM applications, it may be desirable to operate the phases so that there is a disparity in the length of these portions of the cycle. For example, in some applications it may desirable for the turn-on time of a SRM motor phase to last only 30%–45% of the turn-off dwell time. Or, in other applications, it may be desirable for the turn-off time to only be 30%–45% of the turn-on time. From a control standpoint, there is a problem in achieving this type of control using the present ring and sensor capabilities which are available.

SUMMARY OF THE INVENTION

Among the several objects of the present invention may be noted the provision of an improved ring magnet for use in a polyphase SRM; the provision of such an improved ring magnet for use with a Hall effect or similar magnetic sensor to provide position/dwell control information for current application to each motor phase; the provision of such an improved ring magnet in which the respective north and south poles are not equal in circumference about the ring to allow for different turn-on and turn-off dwell times for a motor phase; the provision of such an improved ring magnet having multiple pole sets, including at least one set for each motor phase; the provision of such an improved ring magnet in which there is at least one sensor for each motor phase; the provision of such an improved ring magnet which is usable with a minimum number of magnetic sensors, there being fewer sensors than motor phases and pole sets on the ring; the provision of such an improved ring magnet which provides such information regardless of whether the sensor is positioned radially or axially with respect to the ring; the provision of such an improved ring magnet which is readily installed on the shaft of a SRM; the provision of such an improved ring magnet which is a low cost magnet; and, the provision of such an improved ring magnet to help provide reliable, accurate information to enhance operational control of the motor.

In accordance with the invention, generally stated, a sensing apparatus of the present invention is for use on a single or polyphase switched reluctance motor. The motor has a stator assembly and a rotor assembly including a rotor shaft on which the rotor is mounted for rotation with respect to the stator. Each respective motor is switched between active and inactive states under the control of a commutator control responsive to sensed motor operating conditions. Switching a phase to its active state includes supplying current to the respective rotor phase windings, and switching the phase to its inactive state includes cessation of the current supply. Accordingly, there is a turn-on, running, and turn-off portion of each cycle of current supply to a phase. The turn-on portion of the cycle lasts approximately 35%–45% as long as the turn-off cycle. The apparatus comprises sensing means for continuously sensing the position of the shaft and includes a magnetic ring installed on the rotor shaft and rotatable therewith. It also includes a sensor for sensing changes in a magnetic field produced by the ring as it rotates with the shaft. The magnetic ring has a set of magnetic poles for each motor phase. The portion of the circumference of the ring subtended by one of the poles of each set is greater than that subtended by the other pole of the set. Respective portions of the circumference subtended by the poles in each set is proportional to the turn-off time to the turn-on time. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
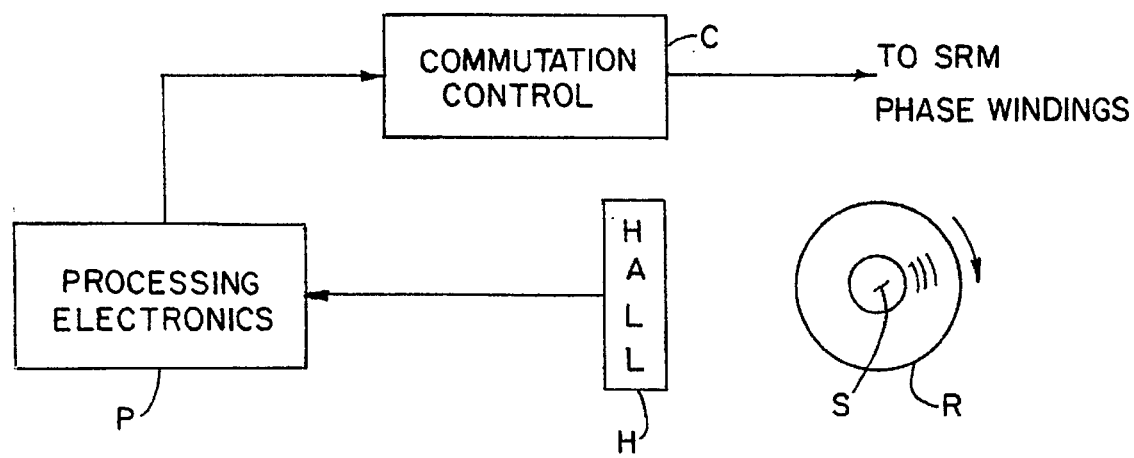
FIG. 1 is a block diagram of a commutation control system for controlling phase switching of a polyphase SRM.
Figure 4A:
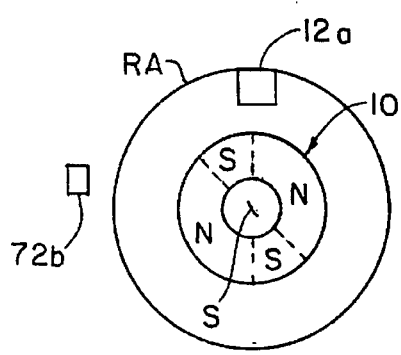
FIGS. 4A and 4B are respective front and side elevational views of a ring magnet installed on an SRM and used with radially aligned Hall effect sensors.
Figure 4B:
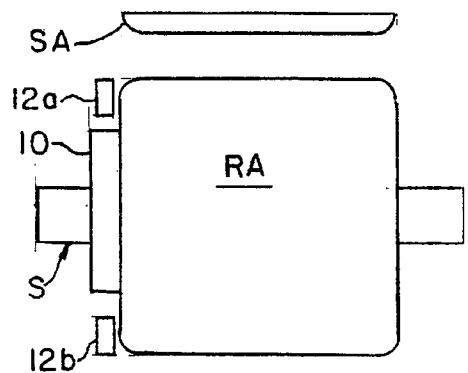
Figure 5A:
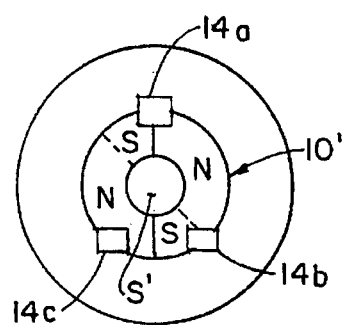
FIGS. 5A and 5B are views similar to FIGS. 4A and 4B but for axially aligned Hall effect sensors; and, FIGS. 6A–6C respectively illustrates the on and off profiles for 50/50 magnet ring, an ON (0.30x–0.45x)/(0.70x–0.55x) OFF magnet ring where X=360/(2. rotor poles)
Figure 5B:
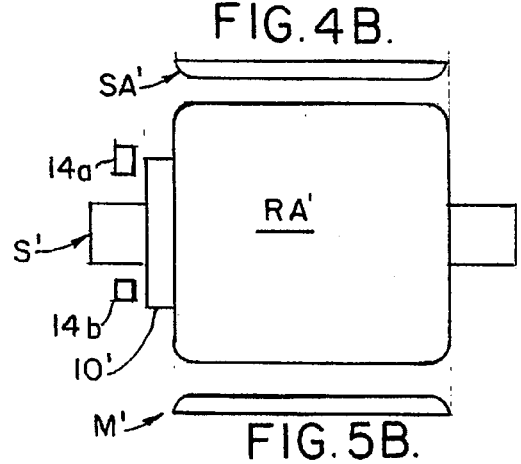

Referring to the drawings, a control scheme for controlling operation of a polyphase switched reluctance motor M is shown in FIG. 1. Motor M, which is shown in FIGS. 4B and 5B has a stator assembly SA, and a rotor assembly RA including a rotor shaft S on which rotor windings are mounted for rotation with respect to the stator assembly. Motor M is, for example, a 1,2,3,4 or 5-phase motor. Operation of a switched reluctance motor is well-known in the art. Typically, a ring magnet R is mounted on shaft S and turns with shaft at whatever its current speed happens to be. A magnetic sensor such as a Hall effect type sensor H is mounted adjacent the ring to detect changes in the magnetic field as the ring rotates. The Hall sensor provides as an output a signal representing the instantaneous position of the rotor shaft. This signal is provided to a processing electronics P which uses this information to produce a commutation control signal supplied to a commutation control C. Control C is responsive to this signal to successively commutate the phases of motor M so current is supplied to respective phase windings of the motor in a sequential fashion.

Figure 2:
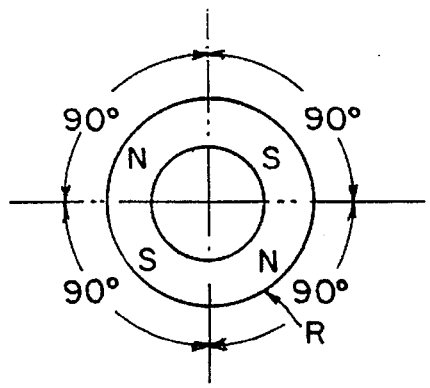
FIG. 2 is an elevational view of a prior art ring magnet for use on a 2 pole SRM.
Figure 6A:
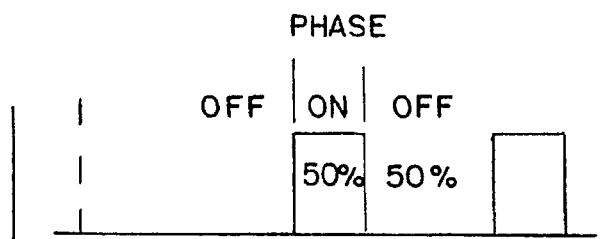

In FIG. 2, a ring magnet R for use on a 2-pole rotor SRM is shown to include two pole sets, one for each rotor pole. For each pole set, both the north pole and the south pole subtend the same portion of the ring circumference. That is, each pole subtends 90 degrees of the circumference of the ring. A profile for application of current to the phase winding of a SRM using ring magnet R is shown in FIG. 6A. As shown in this graph, when a phase is energized by application of current to the windings of that phase, there is turn-on time which lasts from time $T_0$-$T_1$. This is referred to as the dwell portion of the cycle. The phase is de-energized or deactivated at time $T_1$. Subsequent to this deactivation, there is a turn-off portion of the phase. This interval lasts from time $T_2$ to time $T_3$. As is shown in the graph of FIG. 6A, the turn-on time corresponds to the turn-off time.

Figures 6B, 6C:
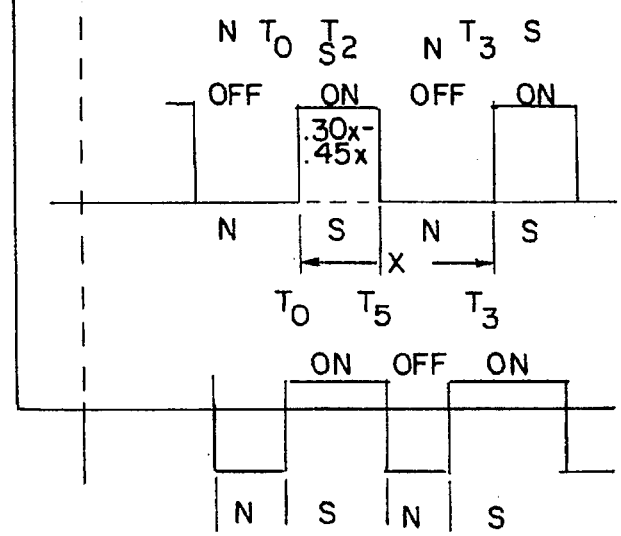

Referring to FIG. 6B, there may be motor M applications in which it is desired for the turn-on time to be significantly shorter than the turn-off time. Thus, the turn-on interval in these applications only lasts from $T_0$-$T_5$; while, the turn-off time lasts from $T_5$-$T_3$. For example, in these applications, it has been found desirable to have the the turn-on time last only about 30%–45% of the turn-off time.

FIG. 6C illustrates an opposite situation in which it is desirable for the turn-on time to be substantially longer than the turn-off time. In these applications, the turn-on time lasts from $T_0$-$T_6$, and the turn-off time from $T_6$-$T_7$. Now, for example, the turn-off time lasts only 30%–45% of the turn-on time.

Figure 3A:
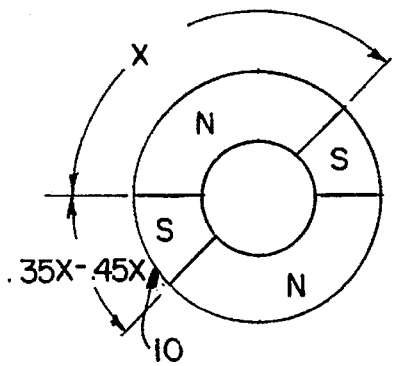
FIG. 3A is an elevational view of an improved ring magnet of the present invention for use on a 2 pole SRM.
Figure 3B:
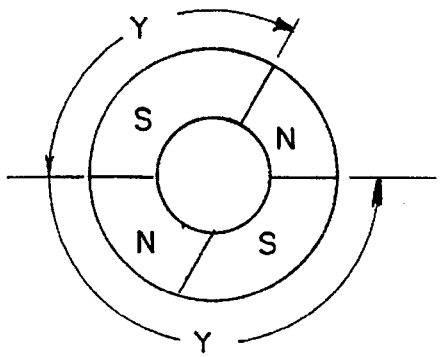
FIG. 3B represents a reversed pole configuration of FIG. 3A.
Figure 3C:
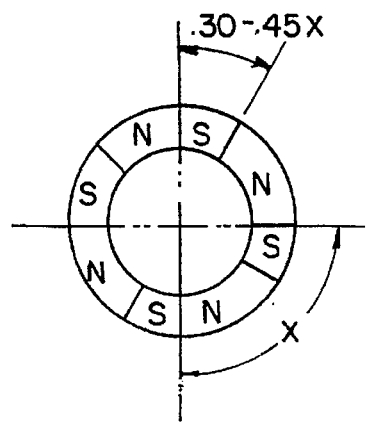
FIG. 3C represents a ring magnet for a 4 pole rotor.

In order to provide this degree of motor control, the improvement of the present invention utilizes a ring magnet 10 or 10' having a number of pole sets corresponding to number of rotor poles. Thus, ring 10 shown in FIG. 3A is for a 2 pole rotor and has two pole sets. Ring 10' in FIG. 3B is for a 4 pole SRM and has four pole sets. In ring 10, the pole set configuration is for the desired operating condition shown in FIG. 6B; i.e., a longer turn-off than turn-on interval. Accordingly, the arc subtended by the north pole of each pole set comprises a larger circumference of the ring than the south pole of that set. As shown, if the angle of the arc of the north/south pole set is X, then the angle of the arc of the south pole is 0.30X–0.45X. In this example, the north pole of each pole set subtends an arc of between 99 and 126 degrees, and the south pole an arc of between 54 and 81 degrees.

With respect to ring 10' of FIG. 3B, its pole set configuration is for the desired operating condition shown in FIG. 6C in which the turn-on time is substantially longer than the turn-off time. In this instance the arc subtended by the south pole of each pole set comprises a larger circumference of the ring than the north pole of the set. If the angle of the arc of the south pole of the set is Y, then the angle of the arc of the north pole is (0.30–0.45) times 360/(2* rotor poles). For the 2 pole rotor configuration of ring 10', the south pole of each set subtends an arc of between 99 and 126 degrees, and the north pole an arc of between 81 and 54 degrees.

The improvement of the present invention further includes providing the same number of magnetic sensors as there are motor phases. In FIGS. 4A and 4B which depict a 2-phase SRM, ring 10 is mounted on rotor shaft S. Two Hall effect sensors 12a and 12b are positioned radially outwardly of ring 10 to detect changes in the magnetic field as the ring rotates. In FIGS. 5A and 5B, for a 3-phase motor M', ring 10' is mounted on shaft S'. The magnetic sensor comprises three Hall effect sensors 14a–14c which are positoned axially rather than radially outward from the ring. The sensors are equidistantly spaced about the ring and are aligned with the longitudinal axis of the rotor shaft. It will be understood that the Hall effect sensors 12 could be axially rather than radially aligned with ring 10. Correspondingly, the Hall effect sensors 14 could radially rather than axially aligned with ring 10', all without departing from the scope of the invention.

While FIGS. 4A, 4B, 5A and 5B respectively depict the same number of Hall effect sensors as there are motor phases, the operation of the invention can also be achieved with fewer than this number of sensors. That is, if there are N number of motor phases or pole sets, appropriate detection of the magnetic fields to provide rotor position information can be achieved using N-1 Hall sensors. Thus, in the embodiment of FIGS. 4A and 4B, Hall sensor 12b can be removed and the motor operated using only sensor 12a. Similarly in FIGS. 5A and 5B, the sensor 14c, for example, can be removed, and the motor properly operated using only sensors 14a, 14b.

What has been described is an improved ring magnet for use in a polyphase SRM. The magnet works with a Hall effect sensor or similar magnetic sensor to provide position/dwell control information to a control circuit for the motor. This is done to control current application to each motor phase. On the magnet ring, respective north and south poles are not equal in circumference. This is because the motor phases have different turn-on and turn-off dwell times. Further, the ring is fabricated with multiple pole sets, there being at least one pole set for each rotor pole. The magnet is used in conjunction with at least one magnetic sensor for each motor phase; or, alternatively, the improved magnet is usable with a minimum number of magnetic sensors, there being fewer sensors than motor phases and pole sets on the ring. The ring magnet provides rotor position information regardless of whether the sensor is positioned radially or axially with respect to the ring. The ring magnet is readily installed on the rotor shaft of a SRM. Finally, the magnet which is a low cost ring magnet which helps provide reliable, accurate information that enhances operational control of the motor.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not ina limiting sense.

Having thus described the invention, what is claimed and desired to be secured by Letters Patent is:

1. In a polyphase dynamoelectric machine having a stator assembly and a rotor assembly including a rotor shaft on which a rotor is mounted for rotation with respect to the stator, the improvement comprising sensing means for continuously sensing the position of the shaft and including a magnetic ring installed on the rotor shaft and rotatable therewith and a sensor for sensing changes in the magnetic field produced by the ring as it rotates with the shaft, the magnetic ring having a set of magnetic poles with the position of the circumference of the ring subtended by one of the poles being a greater portion of the circumference than that subtended by the other pole, the magnetic ring including at least one pole set for each rotor pole, each pole set subtending an equal portion of the ring circumference with one pole of each pole set subtending a larger segment of that portion of the circumference subtended by the pole set than the other pole with the larger pole segment subtending an arcuate segment equal to (0.70–0.55)(360/the number of rotor poles) and the smaller pole segment subtending an arcuate segment equal to (0.30–0.45)(360/the number of rotor poles), the machine having N phases where N is a positive integer greater than one, and the sensing means includes a plurality of sensors the number of which is a function of the number of machine phases.

2. The improvement of claim 1 wherein the one side pole of each pole set subtends approximately 30%–45% of the circumference subtended by each pole set.

3. The improvement of claim 2 wherein the pole of each pole set subtending the larger portion of the circumference is the north pole.

4. The improvement of claim 2 wherein the pole of each pole set subtending the larger portion of the circumference is the south pole.

5. The improvement of claim 1 wherein the sensors are positioned radially outwardly of the ring and aligned therewith.

6. The improvement of claim 1 wherein the sensors are positioned outwardly of the ring and are axially aligned with the longitudinal axis of the rotor shaft.

7. A sensing apparatus for use on a polyphase switched reluctance motor having a stator assembly and a rotor assembly including a rotor shaft on which a rotor is mounted for rotation with respect to the stator, each respective motor phase being switched between active and inactive states under the control of a commutation means responsive to sensed motor operating conditions, switching a phase to its active state including supplying current to respective rotor phase windings, and switching the phase to its inactive state including cessation of the current supply whereby there is a turn-on, running, and turn-off portion of each cycle of current supply the phase the turn-on portion of the cycle lasting approximately 30%–45% the time period of the phase, the apparatus comprising sensing means for continuously sensing the position of the shaft and including a magnetic ring installed on the rotor shaft and rotatable therewith and a sensing means for sensing changes in a magnetic field produced by the ring as it rotates with the shaft, the magnet ring having a set of magnetic poles for each rotor pole with the portion of the circumference of the ring subtended by one of the poles of each set being a greater portion of the circumference than that subtended by the other pole of the set, the respective portions of the ring circumference subtended by the poles in each set being proportional to the turn-off time to the turn-on time with the larger pole segment subtending an arcuate segment equal to (0.70–0.55)(360/the number of rotor poles) and the smaller pole segment subtending an arcuate segment equal to (0.30–0.45)(360/the number of rotor poles), and the motor having N phases where N is a positive integer greater than one, and the sensing means including a plurality of sensors the number of which is a function of the number of motor phases and is constant integer value greater than zero, and with one sensor being used for two motor phases.

8. The apparatus of claim 7 wherein each pole set subtends an equal portion of ring circumference with the one pole of each pole set subtending a larger segment of that portion of the circumference subtended by the pole set than the other pole.

9. The apparatus of claim 8 wherein the pole of each pole set subtending the larger portion of the circumference is the north pole.

10. The apparatus of claim 8 wherein the pole of each pole set subtending the larger portion of the circumference is the south pole.

11. The apparatus of claim 8 wherein the sensors are positioned radially outwardly of the ring and aligned therewith.

12. The apparatus of claim 8 wherein the sensors are positioned outwardly of the ring and are axially aligned with the longitudinal axis of the rotor shaft.

13. A method of controlling phase commutation in a polyphase switched reluctance motor having N phases where N is a positive whole integer greater than one, the motor having a stator assembly and a rotor assembly including a rotor shaft on which a rotor is mounted for rotation with respect to the stator, comprising:

switching each respective motor phase being between an active and an inactive state under the control of a commutation means responsive to sensed motor operating conditions;

continuously sensing the position of the shaft using a magnetic ring installed on the shaft and rotatable therewith, and a number of sensors, the number of said sensors being a function of the number of motor phases and with one sensor being used for two motor phases, each sensor sensing changes in a magnetic field produced by the ring as the ring rotates with the shaft and supplying signals indicative of rotor position to the commutation means and with one of the sensors, wherein switching a phase to the phase active state includes supplying current to the respective rotor phase windings, and switching the phase to the phase inactive state includes ceasing the current supply, there being a turn-on, running, and turn-off portion of each cycle of current supply to the phase, the turn-on portion of the cycle lasting approximately 30%–45% the period of the phase cycle; and, forming the magnetic ring to have a set of magnetic poles for each motor phase with the portion of the circumference of the ring subtended by one of the poles of each set being a greater portion of the circumference than that subtended by the other pole of the set, the respective portions of the circumference subtended by the poles in each set being proportional to the turn-off time to the turn-on time with the larger pole segment subtending an arcuate segment equal to (0.70–0.55)(360/the number of rotor poles) and the smaller pole segment subtending an arcuate segment equal to (0.30–0.45)(360/the number of rotor poles).

14. The method of claim 13 further including providing at least one sensor for each motor phase with the sensors being positioned radially outwardly of the ring and aligned therewith.

15. The method of claim 13 further including providing at least one sensor for each motor phase with sensors being positioned outwaardly of the ring and axially aligned with the longitudinal axis of the shaft.

16. The method of claim 13 wherein the sensors are positioned radially outwardly of the ring and aligned therewith.

17. The method of claim 13 wherein the sensors are positioned outwardly of the ring and axially aligned with the longitudinal axis of the shaft.

* * * * *